United States Patent
Skarsten

[11] Patent Number: 5,833,727
[45] Date of Patent: Nov. 10, 1998

[54] AIR FILTERING MODULE STRUCTURES

[76] Inventor: Darrell L. Skarsten, 14215 Drexel Ct., Apple Valley, Minn. 55124

[21] Appl. No.: 692,048

[22] Filed: Aug. 2, 1996

[51] Int. Cl.[6] .................................................. B01D 50/000
[52] U.S. Cl. ........................... 55/385.2; 55/472; 55/473; 55/483; 55/484; 55/502
[58] Field of Search .................................. 55/385.2, 473, 55/502, 484, 471, 472, 467, 483

[56] References Cited

U.S. PATENT DOCUMENTS

| | | |
|---|---|---|
| 2,935,157 | 5/1960 | First . |
| 3,280,540 | 10/1966 | Soltis . |
| 3,280,541 | 10/1966 | Soltis . |
| 3,707,046 | 12/1972 | De Baun . |
| 3,782,082 | 1/1974 | Smith et al. . |
| 3,884,662 | 5/1975 | Hladik . |
| 3,986,850 | 10/1976 | Wilcox . |
| 4,175,936 | 11/1979 | Lough et al. . |
| 4,233,044 | 11/1980 | Allan . |
| 4,560,395 | 12/1985 | Davis . |
| 4,600,419 | 7/1986 | Mattison . |
| 4,608,066 | 8/1986 | Cadwell, Jr. . |
| 4,819,549 | 4/1989 | Gillingham et al. . |
| 4,846,859 | 7/1989 | Nobiraki et al. . |
| 4,946,484 | 8/1990 | Monson et al. . |
| 4,986,050 | 1/1991 | Brunetti et al. . |
| 5,207,811 | 5/1993 | Buonpastore ............................. 55/502 |
| 5,364,425 | 11/1994 | Simon et al. .......................... 55/385.2 |
| 5,425,793 | 6/1995 | Mori et al. ............................ 55/385.2 |
| 5,637,124 | 6/1997 | Diachuk .................................... 55/342 |

*Primary Examiner*—Jay H. Woo
*Assistant Examiner*—Robert Hopkins
*Attorney, Agent, or Firm*—R. C. Baker & Associates, Ltd.

[57] ABSTRACT

An air filtering module for supplying air comprising a module housing having a rear plenum portion and a front frame portion united together. The plenum portion has a rear air inlet opening. The frame portion has a planar front air outlet opening and has a continuous outer perimeter wall extending substantially perpendicular to the plane of the air outlet opening. A replaceable air filter cartridge and a fan assembly are mounted in the module housing. A perimeter barrier gasket is permanently united to the outer perimeter wall. A plurality of perimeter connecting structures permit mechanical fastening of the outer perimeter walls of adjacent module housings together in an array of modules in a manner compressing the barrier gasket to block air flow between the module housings. The module housings are easily separated from a fastened condition without damage to the perimeter barrier gasket for reconfiguration of an assembly of module housings reusing the barrier gasket. Also, support legs and a shield system and a curtain system are connectable to the module housing.

20 Claims, 3 Drawing Sheets

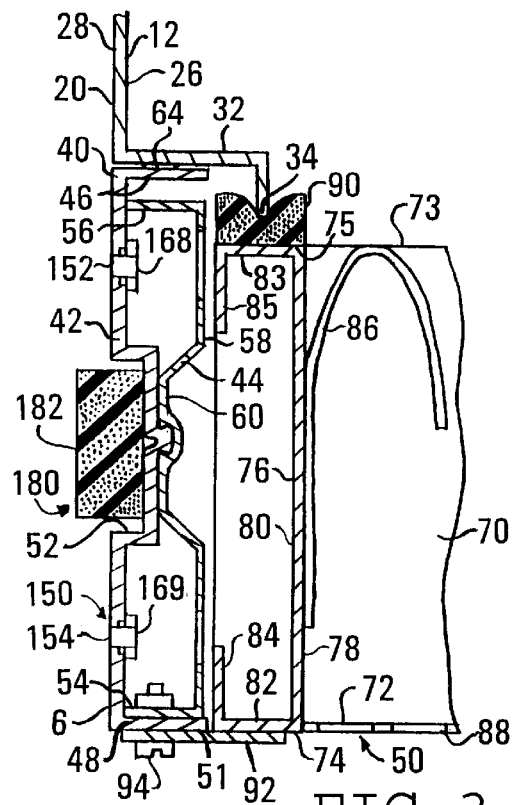
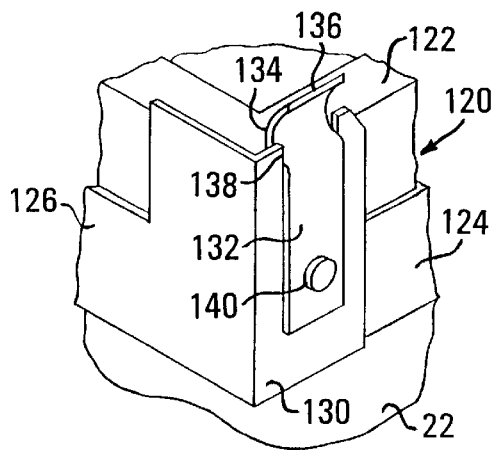
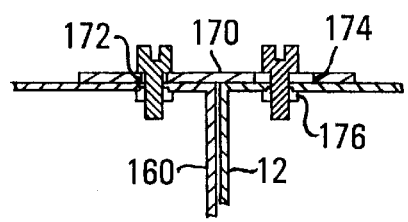
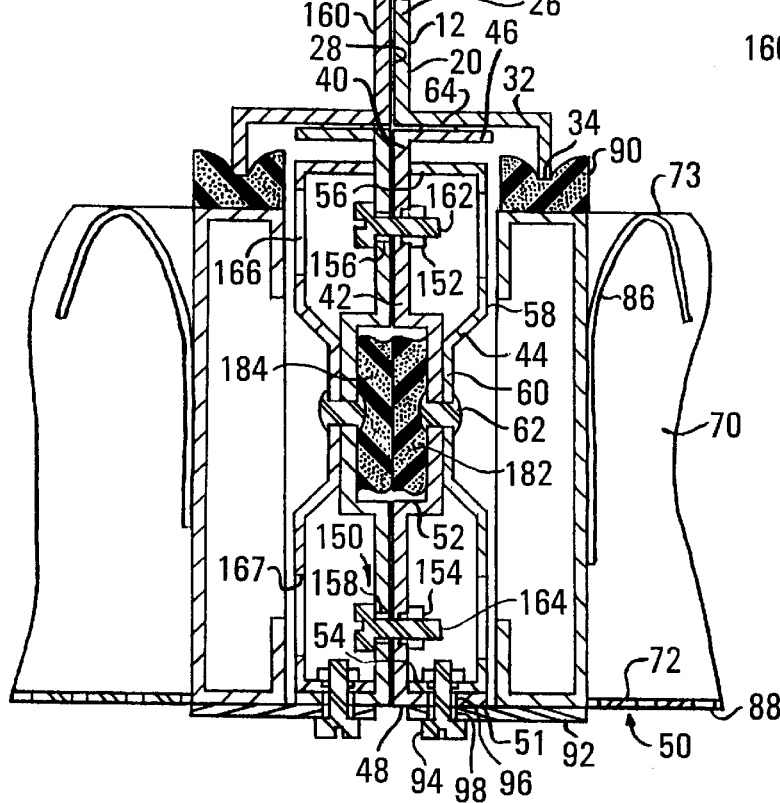

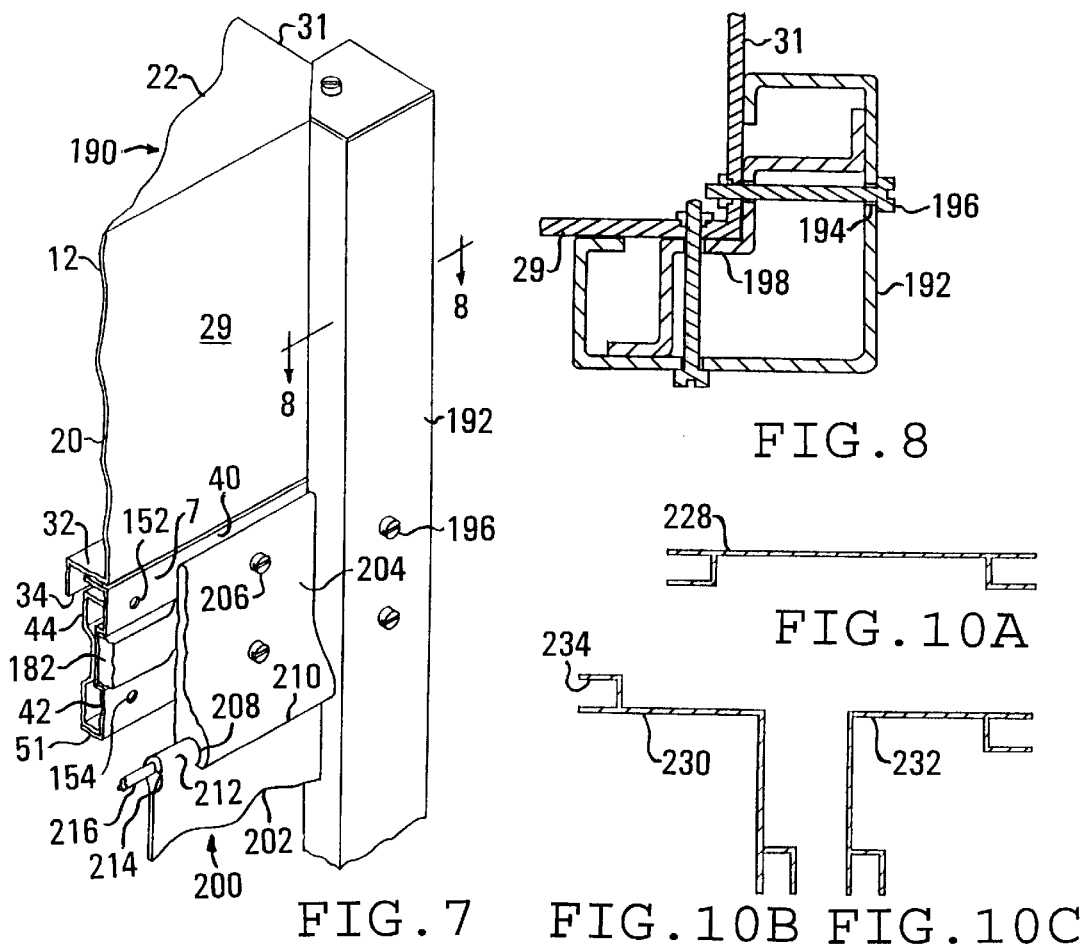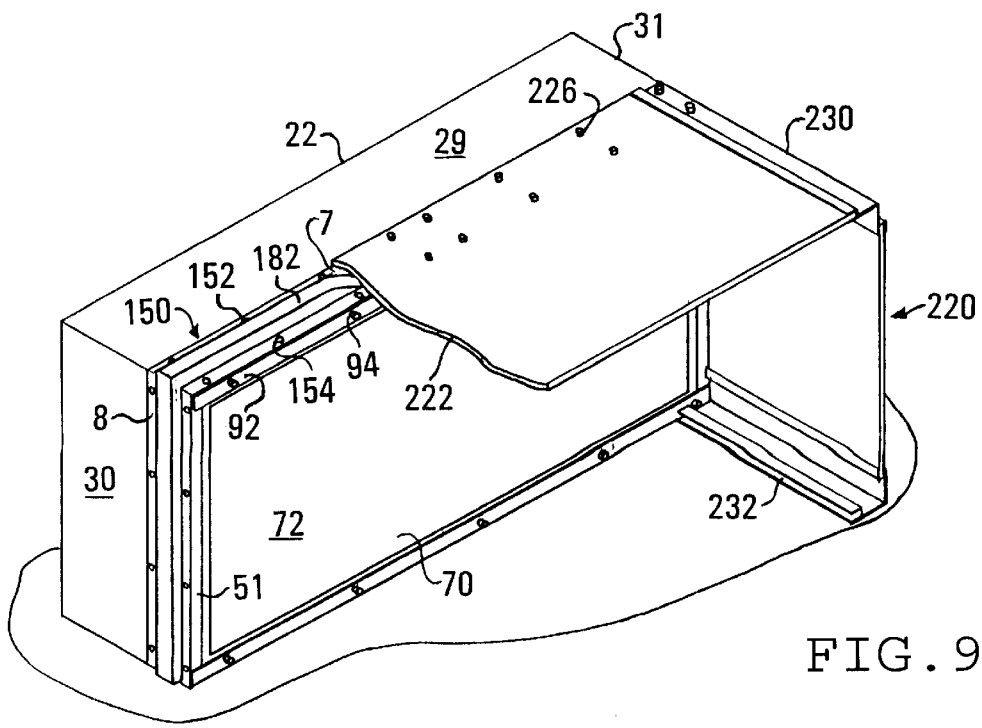

AIR FILTERING MODULE STRUCTURES

SPECIFICATION

BACKGROUND OF THE INVENTION

This invention relates generally to air filtering module structures for providing filtered air for a clean air space, and more particularly to air filtering module structures that may be operated separately from each other or be easily connected together (with the same or similar module structures) to form an array of modules, with the arrayed modules being quickly and easily disconnectable and reconnectable to easily produce a vast variety of configurations.

Clean air spaces having an environment of highly filtered air are often utilized for research and manufacturing activities. Ceiling integrated air filtration systems are commonly used for clean air spaces which occupy an entire room of a building, and these systems often employ a single air plenum (e.g., comprising the upper region of the room) to supply air to multiple air filters. As a result, ceiling integrated systems are typically not well suited for relatively smaller clean air spaces that occupy only a portion of a room, and these systems are not easily transportable or easily reconfigured when the clean air space must be made larger or smaller.

So called "softwall cleanrooms" perform more localized air filtration for creating a clean air space within only a portion of a larger room, and generally comprise a side-by-side grouping of air filtration devices that are supported in an elevated condition above a floor and blow filtered air downward into the clean air space. To support the air filtration devices, the known softwall cleanrooms employ grid systems upon which the devices are typically rested. The grid systems are generally comprised of multiple grid members which are separate from and external to the air filtering devices themselves and thus add complication and expense to the clean air space installation. Also, the known support grid systems do not permit easy reconfiguration of the air filtration devices when the size or shape of the clean air space needs to be changed. For example, the external grids may only be available in a limited range of sizes and shapes, and otherwise must be custom fabricated by the manufacturer, which adds expense and often makes any reconfiguration of the support grid impractical or even impossible. Reconfiguration of grid systems may also require the procurement of additional or different grid member parts.

Furthermore, most known grid systems become a part of an airtight seal between the air filtering devices in the grouping. Many of these systems utilize a caulk sealant bead between the grid members and the air filtering devices, and reconfiguration of the system requires time consuming removal and disposal of the old caulk sealant bead and application of a new bead. Other grid systems employ a sealant gel having a relatively high viscosity to seal between the grid members and the devices, but can be messy to work with during the assembly and disassembly necessary to install and reconfigure the grid system.

SUMMARY OF THE INVENTION

The invention provides air filtering modules that may be used separately and may be connected together with other modules (of the same or similar structure) to form an array of modules without requiring the use of separate external grids to support the modules or to form a seal between adjacent modules. Further, a substantially air tight barrier may be established between adjacent modules of the invention without requiring the use of caulk or gel sealants therebetween.

An air filtering module of the invention comprises a module housing having a rear air inlet opening and a planar front air outlet opening. The module housing has a rear plenum portion and a front frame portion suitably united together. The plenum portion defines a plenum air chamber within the module housing and the frame portion defines a filter cartridge mounting space within the module housing. The frame portion has a continuous perimeter wall having an exterior surface that extends substantially perpendicularly rearward from the plane of the air outlet opening. A replaceable air filter cartridge is mounted in the filter cartridge mounting space of the module housing.

Structural means is located on the perimeter wall of the frame portion for connecting the module housing to another similar module housing with the air outlet openings of the connected module housings oriented in the same plane or substantially the same plane. The air filtering module preferably includes a perimeter barrier structure comprising a perimeter barrier gasket extending substantially continuously about the perimeter wall of the frame portion, such that another module housing may be abutted against a portion of the perimeter barrier gasket to form a substantially airtight barrier relationship therebetween.

A fan assembly is preferably mounted in the plenum air chamber for pulling air into the module housing through the air inlet opening and blowing air out through the air outlet opening.

Two or more modules may be easily connected together to form an array and modules thus connected may be easily and quickly separated from each other and reconnected in various different configurations to form any desired new array of module housings.

The perimeter barrier structure on the module housing may establish a succession of substantially air tight barrier relationships with other module housings without requiring removal or replacement of the barrier gasket to form the next barrier relationship.

Still other features and benefits of the invention will be evident as this description proceeds.

BRIEF DESCRIPTION OF THE DRAWINGS

FIG. 3 is a schematic sectional view of a broken away portion of the module of the invention particularly illustrating the preferred frame perimeter wall connecting structure and perimeter barrier structure when the module is not adjacent to another module;

FIG. 4 is a schematic sectional view of a broken away portion of two adjacent modules in the array shown in FIG. 2 (encompassed by the circle marked "FIG. 4" in FIG. 2) particularly illustrating the relationship of the preferred perimeter wall connecting structure and perimeter barrier structure of the two adjoining modules;

FIG. 5 is a schematic perspective view of a broken away portion of the air filtering module particularly illustrating details of the optional prefilter assembly of the invention;

FIG. 6 is a schematic sectional view of a broken away portion of two adjacent modules in the array shown in FIG.

Figure 1:
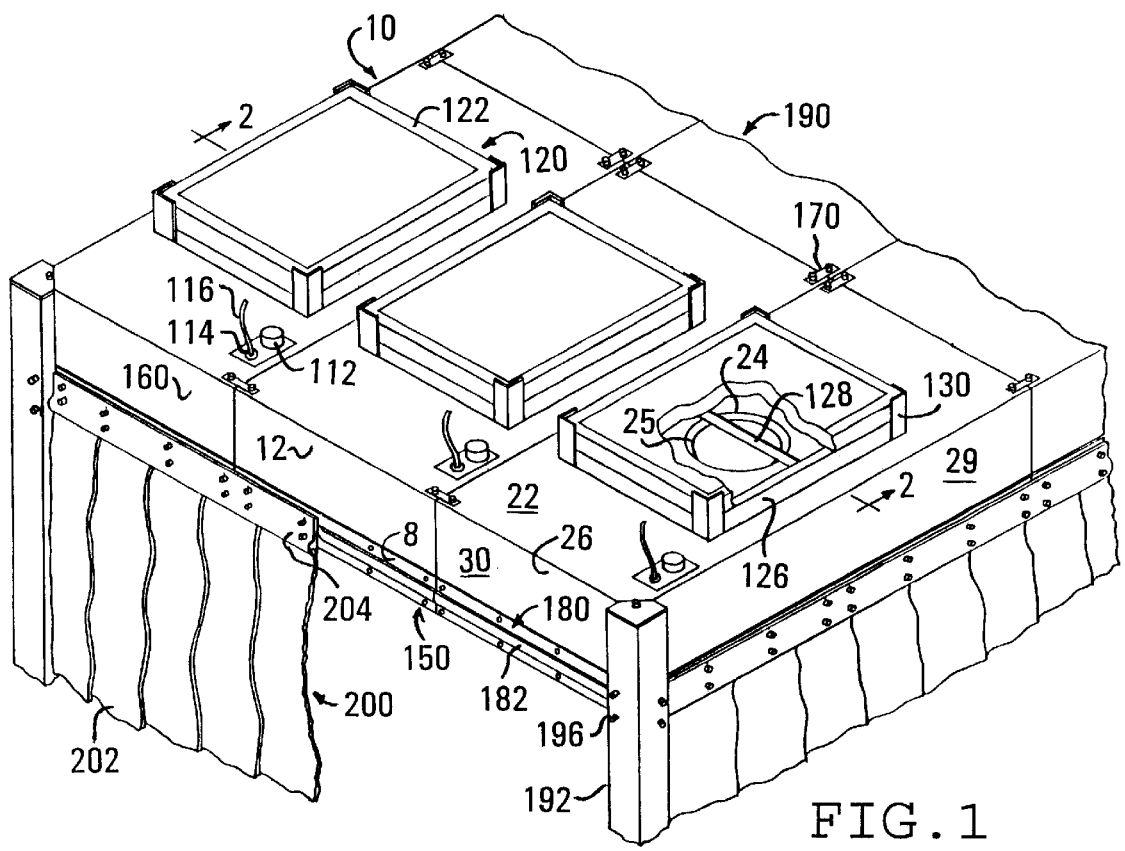
FIG. 1 is a schematic perspective view of an array of air filtering modules of the invention (with portions broken away) with the array being maintained in an elevated condition by support legs and above a clean air space surrounded by an optional curtain system.

2 (encompassed by the circle marked "FIG. 6" in FIG. 2) particularly illustrating the use of the optional auxiliary joining strap;

FIG. 7 is a schematic perspective view of a broken away portion of a module array (with the filter cartridge removed) particularly showing details of an optional curtain system and optional attached support leg;

FIG. 8 is a schematic sectional view of the support leg for the module array taken along line 8—8 of FIG. 7;

FIG. 9 is a schematic perspective view of an air filtering module positioned with the front surface of the filter cartridge in a vertical orientation and particularly illustrating an optional shield system having parts broken away to show underlying relationships;

FIG. 10A is a schematic sectional view of a straight shield plate connector of the shield system;

FIG. 10B is a schematic sectional view of an outside corner shield plate connector of the shield system; and FIG. 10C is a schematic sectional view of an inside corner shield plate connector of the shield system.

DESCRIPTION OF THE PREFERRED EMBODIMENT

The air filtering module 10 (see FIGS. 1 and 2) of the invention comprises a module housing 12 having a plenum portion 20 and a frame portion 40 that includes a perimeter wall joining or connecting structure 150 and a perimeter barrier structure 180. The module 10 also preferably comprises a replaceable filter cartridge 70, a fan assembly 100, and a prefilter assembly 120.

The air filtering module 10 (see FIGS. 1 and 2) generally has a front 2 to be oriented toward a space that is to receive the filtered or clean air flow, and a rear 4 to be oriented away from the filtered or clean air space. The air filtering module 10 comprises a module housing 12 having an air inlet opening 24 in the rear 4 of the module housing through which relatively unfiltered ambient air enters the interior of the housing 12, and an air outlet opening 50 in the front 2 through which filtered air exits the interior of the housing and flows into a clean air space. The planar air outlet opening 50 is defined by a planar and preferably rectangular perimeter rim 51.

The interior of the module housing 12 (see FIG. 2) comprises a plenum air chamber 14 and a filter cartridge mounting space 16 that is located forward of the plenum air chamber 14 and is suitably sized to accommodate a replaceable air filter cartridge 70. The module housing 12 is preferably comprised of a plenum portion 20 that generally surrounds the plenum air chamber 14 in the housing interior and a frame portion 40 (located forward of the plenum portion 20) that generally surrounds the filter cartridge mounting space 16. The plenum portion 20 and the frame portion 40 of the housing 12 are most preferably fabricated from separate parts and suitably united together to form a unitary rigid module housing. Ideally, the plenum 20 and frame 40 portions are permanently united together continuously about the perimeter of the module housing 12.

The frame portion 40 of the module housing (see FIGS. 2, 3 and 9) comprises a frame perimeter wall 42, which is an outer frame wall, and the frame portion preferably includes an inner frame wall 44 located inwardly of the frame perimeter (or outer frame) wall 42. The frame perimeter wall 42 is continuous about the module housing and has substantially planar side exterior surfaces 6, 7 and substantially planar end exterior surfaces 8 that extend substantially and dominantly perpendicularly rearward from the plane of the air outlet opening 50. The exterior surfaces 6, 7, 8 collectively form a continuous exterior perimeter surface about the module housing 12 relatively near the outlet opening 50. The perimeter shape of the frame portion 40 in the plane of the air outlet opening 50 is preferably substantially rectangular, and ideally the length of the side exterior surfaces 6, 7 (measured parallel to the plane of the air outlet opening 50) is no greater than about twice the length of the end exterior surfaces 8 and illustratively the side exterior surfaces are about 122 cm (about 48 inches) long while the end exterior surfaces are about 61 cm (about 24 inches) long. Other rectangular perimeter frame shapes including a square shape may be employed.

The plenum portion 20 (see FIGS. 1 and 2) of the module housing 12 includes a substantially planar rear panel 22 which forms the rear boundary of the plenum air chamber 14. The air inlet opening 24 is preferably circular and centrally located in the plenum rear panel 22 and permits air to enter the plenum air chamber 14. In the most preferred embodiment, the portion of the plenum rear panel 22 surrounding the inlet opening 24 is curved inwardly and forwardly into the plenum air chamber 14 to form a rounded circumferential rim 25 about the inlet opening 24 that guides a smooth air flow into the chamber 14, and ideally into a fan impeller 102 (described below) located within the chamber 14. The rounded circumferential rim 25 about the inlet opening 24 promotes quieter air movement into the module housing during operation as compared to, for example, a non-rounded edge employed about the opening 24.

The plenum portion 20 also comprises a plenum perimeter wall 26 (see FIG. 2) that extends generally forward from the outer periphery of the rear panel 22 to the frame portion 40. The most preferred plenum perimeter wall 26 is essentially a rearward extension of the frame perimeter wall 42 of the frame portion 40 about the rectangular plenum air chamber 14, and is comprised of relatively longer spaced plenum side walls 28, 29 and relatively shorter spaced plenum end walls 30, 31 that are united to each other and to the rear panel 22 in a suitably air tight manner by, for example, welding. Ideally, the exterior surfaces of the plenum side walls 28, 29 and end walls 30, 31 of the perimeter wall 26 are planar and also lie in substantially the same plane as the exterior perimeter surfaces 6, 7, 8 of the frame perimeter wall 42. optionally, the plenum perimeter wall 26 may be located inward of the plane of the exterior perimeter surfaces of the frame perimeter wall 42 (e.g., the plenum perimeter wall 26 may be sloped inwardly and rearwardly from the frame perimeter wall 42).

The most preferred frame perimeter (or outer frame) wall 42 has a generally U-shaped channel configuration (oriented on its side such that it opens inwardly toward the housing interior) with a rear flange 46 and a front flange 48 that forms the rectangular perimeter rim 51 of the air outlet opening 50. The outer frame wall 42 preferably has a central longitudinal perimeter groove 52 in its exterior perimeter surfaces 6, 7, 8 that extends substantially parallel to the perimeter rim 51 (and the front 48 and rear 46 flanges) around the perimeter of the module housing 12. The perimeter groove 52 strengthens the frame portion 40 and provides a mounting surface for the perimeter barrier gasket 182 (described below). The area of the exterior perimeter surfaces 6, 7, 8 occupied by the groove 52 is preferably less than half the total surface area of the frame portion 40.

The inner frame wall 44 preferably also has a generally U-shaped channel configuration (oriented on its side such that it opens outwardly away from the housing interior)

nested substantially within the oppositely oriented frame perimeter wall 42. The inner frame wall 44 has a web section 58 generally spaced inwardly from the frame perimeter wall 42 by front 54 and rear 56 spacing tabs, and the web 58 preferably has an offset portion 60 therein that extends outwardly to abut against the interior surface of the frame perimeter wall 42. The inner frame wall 44 is suitably united at its offset portion 60 to the frame perimeter wall 42 by, for example, a permanent fastening means such as a uniting rivet 62 (see FIG. 4), or by some other suitable means of attachment. The contouring of the perimeter groove 52 in the frame perimeter wall 42 and the offset portion 60 in the inner frame wall 44, especially in combination with the attachment therebetween, enhances the strength of the frame portion 40 and its resistance to flexing or bending.

The preferred plenum perimeter wall 26 has a forward section 32 that is turned inwardly and extends forwardly to a position inward of the frame perimeter 42 and inner frame 44 walls of the frame portion 40. The rear flange 46 of the frame perimeter wall 42 is rigidly united (e.g., by a permanent welded metal bead 64) to the forward section 32 of the plenum perimeter wall 26. The permanent union of the plenum 20 and frame 40 portions into a rigid unitary housing enhances the overall rigidity and strength of the module 10 and resists flexing or deformation of the module housing 12.

The air filtering module 10 also includes a primary or main filter in the form of a replaceable filter cartridge 70 (see FIGS. 2, 3 and 4) for removing particles from the air flow passing through the air filtering module. The filter cartridge 70 is replaceably mounted in the filter cartridge mounting space 16 proximate to the air outlet opening 50 of the module housing 12. A suitable filter cartridge 70 has two major surfaces, which are oriented substantially parallel to the plane of the air inlet opening 50 when the cartridge is located in the mounting space 16. Illustratively, a front surface 72 is oriented toward the air outlet opening 50 and a rear surface 73 is oriented toward the plenum air chamber 14. A front surface perimeter border area 74 and a rear surface perimeter border area 75 are located at the outer regions of the front 72 and rear 73 surfaces of the cartridge 70.

The filter cartridge 70 has a filter perimeter frame 76 which is impermeable to air. The filter frame 76 has a substantially rectangular perimeter shape of a size suitable to fit through the perimeter rim 51 of the air outlet opening 50 and into the filter cartridge mounting space 16. The filter perimeter frame 76 has a generally tall thin C-shaped frame member 78 extending along the entire perimeter of the filter frame with a flat side of the frame member facing inward. The filter frame member 78 has a wall portion 80 extending generally parallel to the direction of air flow through the cartridge 70, with front 82 and rear 83 flange portions projecting perpendicularly outward from the front and rear ends of the wall portion 80. A lip portion is located on the outermost extent of each of the front 82 and rear 83 flange portions. The front lip portion 84 and the rear lip portion 85 each extend in a parallel spaced relationship to the wall portion 80. The front 82 and rear 83 flange portions of the filter frame member 78 respectively lie in the plane of the front 72 and rear 73 surfaces of the filter cartridge 70, and preferably form at least a portion of the respective front 74 and rear 75 surface perimeter border areas.

A sheet of filter media material 86 extends between the spaced flat inward sides of the filter frame member 78 and the perimeter edges of the media material sheet 86 are bonded (e.g., by an adhesive) to the frame member 78 so that air cannot flow between the media 86 and the filter frame 76.

The filter media 86 preferably has a generally serpentine configuration such that the media has a series of zig-zags from the front surface 72 to the rear surface 73 and back again. The preferred filter media 86 is a high efficiency particulate air (HEPA) type filter media having a plurality of small holes therein and which is at least 99.99% effective for removing particles having sizes of 0.3 microns or larger. Other types of filter media may also be used, including ULPA type filter media which is at least 99.999% effective for removing particles of 0.12 microns or larger. Preferably, the front surface 72 of the filter cartridge includes a stiff protective screen 88 extending between the filter frame members 78 to protect the filter media 86 from damage from any objects passing through the air outlet opening 50.

The forward edge 34 of the plenum perimeter wall 26 (see FIGS. 3 and 4) is in a proximate but spaced parallel relationship with the frame perimeter wall 42 and the inner frame wall 44 such that the forward edge aligns with the rear surface perimeter border area 75 of a filter cartridge 70 located in the filter cartridge mounting space 16 to thereby block rearward movement of a filter cartridge 70 from the mounting space 16 into the plenum air chamber 14. The forward edge 34 is capable of forming a continuous perimeter abutment against the rear surface perimeter border area 75 of a filter cartridge 70. Preferably, a resiliently compressible perimeter filter gasket 90 is provided along the rear surface perimeter border area 75 and is mounted on the rear flange portion 83 of the frame member 78. The forward edge 34 of the plenum perimeter wall 26 is preferably a relatively thin or knife edge-like surface (although not sharp enough to damage the gasket 90) that compresses or deforms a central longitudinally extending area of the filter gasket 90 to form a seal that prevents air flow between the forward edge 34 of the plenum portion 20 and the filter cartridge perimeter frame 76.

Significantly, the inner frame wall 44 of the module housing's frame portion 40 spaces the filter cartridge 70 inwardly from the frame perimeter wall 42 and blocks significant outward (e.g., sideways or endways) movement or shifting of the filter cartridge 70 out of its alignment with the plenum forward edge 34.

The air filtering module 10 also includes filter retaining means (see FIGS. 3 and 4) for securing the filter cartridge 70 in the filter cartridge mounting space 16. The retaining means preferably presses rearwardly against the front surface perimeter border area 74 of the filter cartridge 70 such that the perimeter filter gasket 90 is pressed against (and is compressed by) the forward edge 34 of the plenum perimeter wall 26. The filter retaining means preferably comprises a filter retaining strap 92 removably fastened to the front flange 48 of the frame perimeter wall 42 forming the perimeter rim 51 of the air outlet opening 50. A portion of the mounted retaining strap 92 extends inwardly from the front flange 48 to a position in front of the front surface perimeter border area 74 of the filter cartridge 70, and thus blocks forward movement of the filter cartridge through the air outlet opening 50. A retaining strap 92 is preferably mounted along each side section of the perimeter rim 51 and provides sufficient rearward pressure to compress the perimeter filter gasket 90 between the rear surface perimeter border area 75 and the plenum forward edge 34. Optionally, a retaining strap may be mounted on each side section and end section of the perimeter rim 51.

The elongate retaining strap 92 is relatively thin and narrow, and illustratively is formed of approximately 14 gauge (about 0.074 inch or about 2 mm thick) steel that is about 3 cm (about 1.25 inches) wide, but thicker and wider strips may also be employed. The retaining strap 92 is also provided with a series of spaced holes 98 therein (see FIGS. 4 and 9) for accommodating a number of removable strap mounting fasteners 94, such as bolts or screws, that extend through the strap and into the front flange 48 of the frame perimeter wall 42. A series of threaded holes 96 for receiving the strap mounting screws 94 are provided in the front flange 48 at spaced locations that are alignable with the strap mounting holes 98 in the strap 92.

A significant feature of the air filtering module structure is the ability to join or connect two or more of the modules together to create a bank or array of modules having their air outlet openings oriented in substantially the same plane. To permit the connection of modules, the air filtering module comprises structural means for connecting the module housing to another module housing (see FIGS. 1, 3 and 4). The structural connecting means preferably comprises a connecting structure 150 integrated into the exterior surface of the housing 12 and connectable to a same or similar connecting structure of another module. The connecting structure 150 extends around the perimeter of the module housing 12 to permit connection of adjacent modules at various locations along the perimeter of a module. The perimeter connecting structure 150 is preferably substantially parallel to and equidistant from the plane of the air outlet opening 50 at all locations along the perimeter rim 51. The connecting structure 150 is most preferably located on the exterior perimeter surfaces 6, 7, 8 of the frame portion 40.

The preferred connecting structure 150 (see FIGS. 2 and 3) comprises a plurality of spaced connector receiving structures integral to the frame perimeter wall 42. The connector receiving structures most preferably comprise openings or holes for receiving module connector means such as, for example, discrete connector fasteners that secure the frame perimeter walls 42 of adjacent modules together. Illustratively, the connector fastener receiving holes are arranged in a substantially linear row extending about the module housing parallel to the perimeter rim 51 of the air outlet opening 50. Ideally, two parallel rows of fastener holes (e.g., with a rear row of fastener holes 152 being spaced rearwardly from a front row of fastener holes 154) are utilized to provide a more secure joining or connection of the modules that resists relative pivot movement between the modules. The fastener receiving holes 152, 154 are substantially uniformly spaced along the perimeter of the module housing 12 (see FIGS. 1, 2 and 9) and may be readily aligned with similarly spaced or positioned fastener receiving holes 156, 158 in the frame perimeter wall of another module housing 160 (see FIG. 4) when the two module housings are positioned adjacent to each other in a side-to-side or end-to-end (or even end-to-side) relationship. The paired aligned fastener holes 152 and 156, 154 and 158 permit connecting fasteners 162 and 164 to extend through the frame perimeter walls of the adjoining module housings 12, 160 so that progressive tightening of fasteners 162, 164 pulls the adjacent module housings together and secures them against any significant movement relative to each other. Preferably, the adjoining exterior perimeter surfaces of the adjacent housings 12, 160 are directly abutting or touching each other without interposed members between the module housings. Ideally, the plenum perimeter walls rearward of the frame perimeter wall on the housings 12, 160 are in close abutment and may thereby provide between the housings 12, 160 a large area of contact that extends substantially the full front to rear depth of the module.

In the illustrative connecting structure 150 (see FIG. 4), one module housing 160 of the pair of modules to be connected is provided with clearance holes 156, 158 that are sufficiently large in size or diameter to permit connecting fasteners 162, 164 to pass through the clearance holes 156, 158 without significant hindrance (e.g., the fastener does not have to be rotated to pass through the hole). The other, or second, module housing 12 of the pair is provided with threaded holes 152, 154 having internal screw threads suitable for receiving the threaded end of a fastener 162, 164 protruding though the clearance holes 156, 158 of the first module 160. Thus, each pair of aligned holes comprises a clearance hole 156, 158 in one module housing 160 and a threaded hole 152, 154 in the adjacent other module housing 12. Preferably, only clearance holes are provided on one side and one end exterior surface of a module housing 12 and only threaded holes are provided on the other side and end exterior surfaces of the same module, so that clearance holes and threaded holes on separate modules may be easily paired. Other fastener hole arrangements may also be used.

To permit access for installation and removal of the fasteners 162, 164 connecting the modules, a pair of fastener access holes 166, 167 (see FIGS. 4) are provided in the inner frame wall (of the module housing 160) opposite to each of the clearance holes 156, 158 in the outer frame wall. (Note that similar interior access to the threaded fastener holes 152, 154 in the modules is generally not required, but access holes therefore may be provided.) The threaded fastener holes 152, 154 are preferably formed in the frame perimeter wall 42 by press fitting screw-threaded inserts 168, 169 into the appropriate fastener receiving holes 152, 154 of the connecting structure 150.

The most preferred embodiment of the module has a rear mounting hole 176 (see FIG. 6) located in the plenum rear panel 22 near each corner thereof. Optionally, an elongate auxiliary joining strap 170 having a hole 172 near one end and an elongated hole or slot 174 at the opposite end may be bridged between adjacent module housings 12, 160 and fastened to the rear panels using the rear mounting holes 176. The joining strap 170 provides additional securing of the modules together. The slot 174 provides for variance in the proximity of the adjoining housings 12, 160. When the plenum rear walls of adjacent modules are significantly spaced from each other (e.g., when the plenum perimeter wall of each module slopes away from the other module), the joining strap 170 may be suitably long to bridge between the respective housing's rear panels.

Another significant feature of the air filtering module is the ability to form a substantially air tight barrier to air flow between the exterior surface of the module housing and the surface of a structure or object located adjacent to the housing. An integral perimeter barrier structure 180 on the module housing 12 permits such a barrier relationship to be established with the surfaces of objects brought into pressing abutment with the barrier structure 180. The object with which the barrier is formed may comprise, for example, another module (e.g., joined to the module to form an array) or a shielding element mounted on the module housing 12 for isolating a space adjacent to the air outlet opening 50 from unfiltered ambient air about the module.

Figure 2:
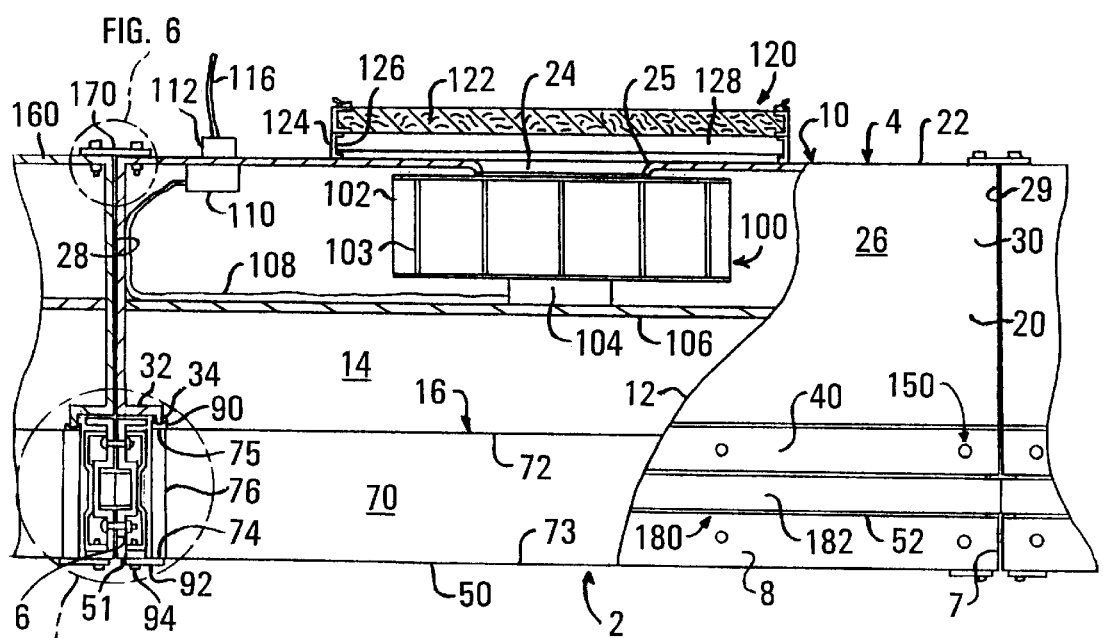
FIG. 2 is a schematic partial sectional view of an array of modules taken along line 2—2 of FIG. 1 (with parts of adjacent modules broken away)

The preferred perimeter barrier structure 180 is comprised of a resiliently compressible gasket 182 that extends continuously about the perimeter of the module housing 12 in a spaced parallel relationship to the perimeter rim 51 of the air outlet opening 50 (see FIGS. 1, 2 and 9). The preferred perimeter gasket 182 is suitably mounted (e.g., with a permanent adhesive) on the exterior perimeter surfaces 6, 7, 8 of the frame perimeter wall 42 of the housing 12 (see FIG. 3). The gasket 182 is preferably located closely adjacent to the connecting structure 150, and is ideally positioned between (and extends parallel to) the parallel rows of fastener holes 152, 154 of the preferred connecting structure 150, a relationship that provides for the secure and uniform compression of the perimeter gasket 182 against an abutting object surface, especially one that is joined or connected to the module housing via the connecting structure 150.

The perimeter gasket 182 is most preferably mounted in the perimeter groove 52 formed in the frame perimeter wall 42 of the frame portion. The perimeter groove 52 has a shape and size that is suitable for securely seating the gasket 182 (such as, for example, a rectangular channel shape, a V-shape, or a semi-circular shape). The thickness of the perimeter gasket 182 is greater than the depth of the perimeter groove 52 such that the gasket protrudes out of the groove (and the plane of the frame perimeter wall 42) to permit the gasket to abut and press against a surface of an object brought into close proximity to the frame perimeter wall 42 to form a substantially air tight barrier therebetween. The perimeter groove 52 advantageously allows an abutting surface to compress the perimeter gasket 182 to a level substantially at or below the plane of the exterior surface of the frame perimeter wall, while the gasket is still able to exert pressure on the abutting surface. The perimeter groove 52 prevents the perimeter gasket 182 from possibly acting as a fulcrum between, for example, the frame perimeter walls of adjacent modules and causing rocking or pivoting of the connected modules relative to each other.

Significantly, the perimeter barrier structures 180 of similarly equipped individual modules (see FIGS. 2 and 4) are readily alignable with each other to form a barrier to air flow between module housings connected together to form an array. The perimeter gasket 182 on one module housing 12 contacts and compresses (and in turn is compressed by) the perimeter gasket 184 on an adjacent module housing 160 when the modules are connected together using the connecting structure 150. The perimeter gasket 182 may thus form a substantially air tight barrier to air flow between the exterior perimeter surfaces of adjacent module housings in the array. Significantly, direct connection of adjacent module housings together using the connecting structure 150 (along with the substantially planar exterior surfaces) minimizes the gap between adjacent module housings that must be blocked or sealed against air flow (as compared to, for example, air filtering device groupings utilizing support grid members that space apart neighboring devices).

Also significant is the ability of the integral perimeter barrier structure 180 to be reused to form a number of successive barrier relationships without requiring removal or renewal or replacement of the barrier structure before the next barrier relationship may be established. The preferred perimeter barrier gasket 182 of a module housing does not form a viscid bond (e.g., adhesive or viscous) with an adjoining housing or an external support member. Thus the modules of an array may be repeatedly reconfigured with the perimeter barrier structure of each module being reusable for each reconfiguration.

The integration of an air plenum, fan assembly and air filter cartridge into each module housing produces a self-contained air filtering module that may be effectively used separately of other modules or in an array comprised of other similar modules. The special connecting and barrier features of the air filtering module each permit the module to be utilized in a variety of different module array configurations. A particular array configuration may be easily assembled using the connecting structure 150 and made substantially airtight using the barrier structure 180. Disassembly and assembly of an array for reconfiguration of the modules in an array (in the same or a different location after transport) is made exceedingly simple by the integral reusable connection and barrier structures, and may be performed on repeated occasions without requiring the replacement of support or sealing elements.

The self-contained modules may be connected and operated in various orientations, such as with the air inlet opening 24 positioned above the air outlet opening 50 to produce a downward vertical air flow, or with the air inlet and outlet openings at substantially the same vertical height to produce a horizontal air flow across, for example, a work surface located adjacent to the outlet opening 50.

One illustrative implementation of the air filtering module 10 (see FIG. 1) comprises positioning a horizontal array of modules in an elevated condition above the floor of a room to produce a space therebetween (e.g., below the module array) into which filtered air is blown. To create an array, a suitable number of modules for the desired array size or shape or air filtering capacity characteristics are joined together utilizing the connecting structure 150 on each module.

Optionally, dummy modules (not shown) may be included in the module array to expand or extend the size of the canopy provided by the elevated array beyond the size of the air filtering modules utilized. Preferred dummy modules have housings with a connecting structure and a perimeter barrier structure substantially identical to those of an air filtering module 10 but lack the operative filtering elements of the module, such as a filter cartridge 70, the fan assembly 100, and prefilter assembly 120. A lighting fixture may be mounted in the interior of a dummy module's housing to provide illumination for the clean air space below the array. A dummy module is preferably similar in size and shape to the air filtering modules 10 to thereby permit easy integration of dummy modules into an array of air filtering modules.

A preferred means for supporting an array 190 of modules (or even a single module) in an elevated condition employs support legs 192 (see FIGS. 1 and 7) which are each mounted individually and directly to the housing of a module located along the periphery of the array 190. Preferably, a support leg 192 is mounted on each module located at the corners of the array 190, and in some installations (e.g., where the distance between the corner modules is especially great), support legs may be mounted at additional locations along the periphery of the array. Modules in the array that do not have attached support legs 192 are preferably solely supported through their mounting to adjacent modules of the array through the connecting structures 150, which permits the entire array to be supported without the use of a supporting grid or other external members extending below or between the modules. Significantly, the preferred plenum perimeter walls 26 are substantially planar with the exterior surfaces of the frame perimeter wall, which provides a relatively large and deep (front to rear) area of abutment between adjacent module housings that resists any tendency of the modules located toward the middle of the elevated array to sag downwardly.

Each support leg 192 is preferably provided with leg mounting holes 194 (see FIGS. 7 and 8) that are alignable with fastener receiving holes of the connecting structure 150 on a module housing 12. A leg mounting bolt 196 secures the support leg 192 to the joining structure 150 on the module housing outer frame wall 42. A leg alignment member 198 located in the interior of the support leg 192 promotes proper alignment and spacing between the support leg and the module housing 12.

A clean air space below an elevated array 190 of modules may be at least partially shielded or isolated from the surrounding unfiltered ambient air through the use of, for example, a curtain system 200 mounted on the periphery of the module array 190. The filtered air blown into the shielded space by the arrayed modules creates a positive pressure differential in the shielded space relative to the ambient unfiltered air about the shielded space, a differential which discourages the unfiltered ambient air from entering the shielded space. The preferred curtain system 200 (see FIGS. 1 and 7) is comprised of a plurality of partially overlapping elongate flexible plastic curtain strips 202 that depend from the periphery of the module array 190 and are easily parted by a person so as to permit easy entry into and exit from the curtained clean air space below the module array 190. The preferred curtain system 200 employs curtain support members 204 removably fastened against the exposed exterior surfaces of the modules located on the periphery of the array 190. The support members 204 are provided with mounting holes (not shown) that are alignable with the fastener holes 152, 154 of the connecting structure 150 on a module to permit a mounting bolt 206. The curtain support member 204 is a generally thin elongate member with a downward edge 210 having a C-shaped recess 208 (opening downward) therein for mounting the curtain strips 202 to the support member. The recess 208 has an interior space that is generally wider than the width of the entry slot into the recess. The recess 208 receives the upper ends 212 of the curtain strips 202, which have an interior loop 214 formed therein near the upper end 212 for receiving an expansion rod 216. Insertion of the expansion rod 216 into the interior loop 214 expands the upper end 212 of the curtain strip 202 such that the upper end may not be withdrawn from the C-shaped recess 208. Removal of the expansion rod 216 from the interior loop 214 allows the loop to collapse in size and thus permits the upper end 212 to be withdrawn from the C-shaped recess 208.

Optionally, the module array 190 may be maintained in an elevated condition by suspension from above the array 190 using the rear mounting holes 176 (see FIG. 6) in the rear panels 22 of the arrayed modules to mount suspension means such as, for example, support rods or eye bolts for suspension cables or chains (not shown).

Another illustrative implementation of the air filtering module takes advantage of the substantially planar exterior surfaces of the module housing 12 which permits the module 10 (see FIG. 9) to be rested with its side 6, 7 or end 8 exterior surfaces on a relatively flat surface for blowing filtered air horizontally across an adjacent work surface. Optionally, multiple modules may be joined end-to-end to produce a linear array of modules that is especially suitable for placement closely adjacent to a linear conveyor path (and any work stations located along the conveyor path) to blow filtered air over sensitive materials being transported on the conveyor.

An optional feature especially suitable for use with a single module or a linear array of modules is a shield system 220 (see FIG. 9) for at least partially isolating or shielding the space in front of the module and adjacent to the air outlet opening 50 10 from contamination by unfiltered ambient air. A preferred shield system 220 is comprised of planar shield plates 222 removably attached directly to the exterior surface of the module housing 12 and projecting forwardly beyond the plane of the air outlet opening 50. Ideally, the shield plates 222 are adapted to be mounted on the module using the connecting structure 150 and threaded fasteners 226 (such as screws or bolts). The plates 222 are preferably of a length that generally corresponds to a the length of a side 6, 7 or end 8 exterior surface of the frame portion 40 and are provided with mounting holes (not shown) that are alignable with the fastener receiving holes 152, 154 of the connecting structure 150 on the module. The mounted shield plates 222 may thus be pressed against to compress the perimeter barrier gasket 182 located between the rows of fastener holes 152, 154, which blocks air from flowing between a shield plate 222 and the module housing 12. Shield plates 222 may be attached to each of the side 6, 7 and end 8 exterior surfaces of the module housing 12, if desired. Typically the front of the shielded space is left open (unblocked by a shield) to permit exit of the filtered air flow from the shielded space and also to permit access to the space by a worker. Shield connectors may be provided at the juncture of shield plates 222 to connect adjacent side or end exterior surface mounted shield plates and block air infiltration through any gap between adjacent shield plates. The shield connectors may include straight connectors 228 (see FIG. 10A), outside corner connectors 230 (see FIG. 10B), and inside corner connectors 232 (see FIG. 10C). The shield connectors are also provided with holes alignable with the fastener holes 152, 154 of the connecting structure 150 to mount the connectors. Shield plate receiving slots 234 along the lateral margins of the elongate shield connectors receive the edges of adjacent shield plates 222. The preferred shield plates 222 are formed from ¼ inch thick methyl methacrylate (sold under the tradename PLEXIGLAS) and the preferred shield connectors comprise formed aluminum sheet pieces spot welded together, but other materials and fabrication techniques (such as aluminum extrusions for the connectors) may also be used.

The air filtering module 10 also preferably includes a fan assembly 100 (see FIG. 2) for pulling air in through the air inlet opening 24 in the plenum rear panel 22. The fan assembly 100 is preferably located in the plenum air chamber 14 directly and closely in front of the air inlet opening 24. The preferred fan assembly is comprised of a centrifugal fan impeller 102 and an electric fan motor 104 connected to the fan impeller, and the preferred fan assembly has the fan motor 104 substantially centrally mounted at least partially within the hub area of the impeller 102. The impeller 102 is preferably of the type having backwardly curved blades 103, and therefore does not require internal baffles (or other walls mounted within the plenum air chamber 14) designed to guide air exiting the impeller away from the impeller. The internal structure of the plenum portion 20 is thereby greatly simplified and free of baffle walls. The impeller 102 and motor 104 are supported within the plenum air chamber 14 by a fan support 106 that extends generally parallel to the plenum rear panel 22 and is fixed on opposite ends to the side walls 28, 29 of the plenum perimeter wall 26. Power is supplied to the fan motor 104 through power wires 108 connected to a variable speed control 110 (optionally with an on/off switching capability) mounted on the rear panel 22 and having a speed control knob 112 for adjusting the level of power supplied to the fan motor 104, and thus controlling the speed of the fan impeller 102 (and generally the speed of air flow into the plenum air chamber 14). Power is supplied to the speed control 110 by a power cord 116 (see FIGS. 1 and 2) which extends through a substantially air tight fitting 114 in the plenum rear panel 22 and is connected to an electrical supply circuit (not shown).

In the most preferred embodiment of the invention, a prefilter assembly 120 (see FIGS. 1, 2 and 5) is provided to filter out relatively large particles from the air flow before the air enters the plenum air chamber 14 and encounters the primary filter cartridge 70. A preferred prefilter cartridge 122 is substantially rectangular and mounted parallel to the plenum rear panel 22 to intercept the air flow before the air enters the air inlet opening 24. A rectangular prefilter support structure 124 is mounted on the exterior surface of the plenum rear panel 22 and surrounds the air inlet opening 24. The support structure 124 supports the perimeter regions of the prefilter cartridge 122 and spaces the front surface of the prefilter cartridge away from the air inlet opening 24 (preferably at least about 0.5 inches (about 1.3 cm) and illustratively about 1 inch (about 2.5 cm)) to promote more evenly distributed air flow through the prefilter 122. The prefilter support structure 124 is preferably formed by a perimeter U-shaped channel 126 (oriented on its side such that it opens inwardly), with the front arm of the perimeter channel 126 mounted on the plenum rear panel 22 and the rear arm of the perimeter channel 126 contacting the perimeter regions of the prefilter cartridge 70. A prefilter support bar 128 extends between opposite sides of the support structure perimeter channel 126 and across the air inlet opening 24 to provide additional support for the middle portions of the prefilter cartridge 70 against sagging or being pulled into the inlet opening 24 by the suction of the fan impeller 102 inside the plenum air chamber 14. Optionally, more than one support bar 128 may be employed.

Prefilter cartridge 122 replacement is significantly simplified by special features of the prefilter assembly 120. A prefilter positioning angle 130 (see FIG. 5) is located at each corner of the support structure 124 and protrudes rearwardly to a point slightly beyond the rear surface of the prefilter cartridge 122. The positioning angles 130 help guide the prefilter cartridge 122 into the correct position on the support structure 124 during cartridge insertion and prevent lateral movement of the prefilter 122 once installed.

The most preferred positioning angle 130 is unitary with (e.g., formed from the same piece of material as) a perimeter channel 126 of the support structure 124, and ideally both positioning angles 130 located at the end of the support structure are unitary with the perimeter channel 126 on the end of the structure 124. Optionally, a positioning angle 130 may be formed from a separate piece and mounted to the plenum rear panel 22 or support structure channel 126.

The preferred prefilter assembly 120 also includes a prefilter retaining clip 132 to hold the prefilter cartridge 122 securely in place against the support structure 124 by preventing unwanted rearward movement of the cartridge 122 away from the perimeter channel 126. The retaining clips 132 also permit quick and easy removal and replacement of the prefilter cartridge 122 without having to, for example, remove separate fasteners or filter holding frames. A retaining clip 132 is mounted near each corner of the prefilter support structure 124 in a position substantially perpendicular to the plane of the rear panel 22. A portion 134 of the retaining clip 132 near the free rearward end 136 is curved inward and protrudes behind the rear surface of the prefilter cartridge 122. In its normal position, the curved portion 134 blocks rearward movement of the prefilter cartridge 122 and thus holds the cartridge in the proper mounted position. Manual pressure may be applied to the retaining clip 132 to move it outward from its normal position and thereby permit movement of the prefilter cartridge edge rearward past the curved portion 134 of the clip 132. The retaining clip 132 returns to its normal position after the manual pressure is removed. The curvature of the retaining clip 132 also permits a replacement prefilter cartridge 122 to be easily slipped forwardly past the clip's protruding curved portion 134 (as the curved portion is pushed or deflected outwardly by the prefilter cartridge edge).

In the most preferred embodiment, each retaining clip 132 is mounted on the outward surface of a positioning angle 130 and the curved portion 134 of the clip 132 protrudes through a notch 138 in the rearmost end of the positioning angle. Significantly, in this preferred arrangement, a clip 132, a positioning angle 130 and the support structure perimeter channels 126 meeting at a corner of the prefilter support structure 124 may be held together with a single fastener 140 (such as, for example, a rivet). optionally, the retaining clip 132 may be mounted separately from the positioning angle 130 and spaced from the corner of the support structure 124.

The various gaskets that may be employed with the invention (e.g., the filter cartridge perimeter gasket 90 and the perimeter barrier gasket 182) are all preferably formed from a suitable resiliently deformable material, such as a closed cell foamed material.

An optional manner of forming a permanent connection between parts, such as, for example, the outer frame perimeter wall 42 and the web section 58 of the inner frame wall 44 (see FIG. 3), involves pushing a small portion of the material of a first part (e.g., the frame perimeter wall 42) against a second part (e.g., the inner frame wall web section 58) with sufficient force to create a recess or cavity within the second part and press the pushed or protruding portion of the first part into the cavity. The protruding portion of the first part flares or mushrooms into a size that is somewhat larger than the entrance into the cavity of the second part. The protruding portion of the first part is thus restricted from being withdrawn from or pulled back through the cavity entrance in the second part, thereby locking the first and second parts together without creating a hole in the parts that might allow air leakage through the connected parts. This technique may also be employed for connecting other parts of the module.

Those skilled in the art will readily recognize that this invention may be embodied in still other specific forms than illustrated without departing from the spirit or essential characteristics of it. The illustrated embodiment is therefore to be considered illustrative and not restrictive, the scope of the invention being indicated by the appended claims rather than the foregoing description; and all variations that come within the meaning and range of equivalency of the claims are intended to be embraced thereby.

That which is claimed is:

1. An air filtering module for supplying air to a clean air space, comprising:

a module housing having a rear plenum portion and a front frame portion united together, said plenum portion defining a plenum air chamber having a rear air inlet opening and a forward perimeter edge, said frame portion defining a filter cartridge mounting space and a planar front air outlet opening, said frame portion having a continuous outer perimeter wall extending substantially perpendicular to the plane of said air outlet opening and having a rectangular configuration, a replaceable air filter cartridge mounted in the filter cartridge mounting space of said module housing, said cartridge having a front surface oriented toward said air outlet opening and a rear surface oriented toward said plenum air chamber, said rear surface of said cartridge being blocked against rearward movement into said plenum portion by said forward perimeter edge of said plenum portion.

a fan assembly mounted in said plenum air chamber for moving air through said air inlet opening and said filter cartridge and out said air outlet opening, a perimeter barrier gasket permanently united to said outer perimeter wall of said frame portion at a location spaced rearwardly from and parallel to said air outlet opening, said gasket being in a plane lying between said front and rear surfaces of said cartridge, and a plurality of perimeter connecting structures carried by said outer perimeter wall of said frame portion at locations rearwardly from the plane of said air outlet opening, at least some of said connecting structures being located forwardly of the plane of said gasket and rearwardly of the plane of the front surface of said cartridge, said connecting structures permitting mechanical fastening of the outer perimeter wall of said module housing to the outer perimeter wall of another said module housing in a manner compressing said barrier gasket to form a substantially air tight barrier to air flow between said module housings, said module housings being easily separated from a said fastened condition without damage to said perimeter barrier gasket for reconfiguration of an assembly of said module housings reusing said barrier gasket.

2. The air filtering module of claim 1 wherein said perimeter barrier gasket extends substantially entirely and continuously along the outer perimeter wall of said module housing.

3. The air filtering module of claim 1 wherein said perimeter barrier gasket comprises resiliently compressible material.

4. The air filtering module of claim 1 additionally comprising a perimeter groove formed in the outer perimeter wall of said frame portion and extending substantially parallel to the air outlet opening, said perimeter barrier gasket being mounted in said perimeter groove and protruding outward from the outer perimeter wall.

5. The air filtering module of claim 1 wherein said perimeter connecting structures comprise a row of fastener receiving holes in said outer perimeter wall, said row being in a parallel relationship to the plane of said air outlet opening.

6. The air filtering module of claim 1 wherein said perimeter connecting structures comprise two spaced rows of fastener receiving holes extending in parallel relationship to the plane of said air outlet opening.

7. The air filtering module of claim 6 wherein said perimeter barrier gasket is located between said rows of fastener receiving holes, and wherein both said rows lie in planes between said front and rear surfaces of said cartridge.

8. The air filtering module of claim 1 wherein the plenum portion of said module housing comprises a plenum perimeter wall extending rearwardly from said outer perimeter wall of said frame portion in a manner such that the fastening of another module housing to the perimeter connecting structures of said module housing would cause abutment of the plenum perimeter wall of said module housing against the plenum perimeter wall of said other module housing, thereby enhancing the stability of the fastening between the module housings.

9. The air filtering module of claim 8 wherein said air inlet opening lies in a plane substantially parallel to the plane of said air outlet opening, and wherein said plenum perimeter wall extends from said frame portion substantially to the plane of said air inlet opening.

10. The air filtering module of claim 1 additionally comprising a shield system for at least partially isolating a clean air space adjacent to the air outlet opening of said module housing, said shield system comprising at least one shield plate connected to the perimeter connecting structures of said module housing so that said shield plate presses against said perimeter barrier gasket to thereby form a substantially airtight barrier relationship between said shield plate and said module housing.

11. The air filtering module of claim 10 wherein said shield plate comprises a substantially stiff material and projects forwardly from said module housing beyond the plane of said air outlet opening.

12. The air filtering module of claim 10 wherein said shield plate comprises transparent material.

13. The air filtering module of claim 1 additionally comprising a curtain system for at least partially isolating a clean air space below the air outlet opening of a module housing placed in an elevated condition, said curtain system comprising a curtain support member and a flexible curtain depending from said curtain support member, said curtain support member being connected to the perimeter connecting structures of said module housing in a manner pressing said curtain support member against said perimeter barrier gasket of said module housing to thereby create a substantially airtight barrier relationship.

14. The air filtering module of claim 1 additionally comprising support legs for supporting said module housing in an elevated condition above a clean air space, each said support leg being directly connected to a said module housing using the perimeter connecting structures thereon, wherein a said leg-supported module housing is capable of providing support to another said module housing connected thereto.

15. The air filtering module of claim 1 additionally comprising a filter retaining strap for securing said air filter cartridge in the filter cartridge mounting space of said module housing, said filter retaining strap being removably fastened to said frame portion at locations proximate to said air outlet opening and extending laterally inward from said frame portion in front of said air filter cartridge so as to hold said air filter cartridge in said filter cartridge mounting space, said filter cartridge being removable for replacement by simply removing said retaining strap.

16. The air filtering module of claim 15 wherein the rectangular frame portion of said module housing has a pair of opposing side sections and a pair of opposing end sections, and wherein a filter retaining strap is mounted on at least one said pair.

17. An array of at least two air filtering modules for supplying air to a clean air space, each air filtering module of said array comprising:

a module housing having a rear plenum portion and a front frame portion united together, said plenum portion defining a plenum air chamber having a rear air inlet opening, said frame portion defining a filter cartridge mounting space and a planar front air outlet opening, said frame portion having a continuous outer perimeter wall extending substantially perpendicular to the plane of said air outlet opening and having a rectangular configuration, a replaceable air filter cartridge mounted in the filter cartridge mounting space of said module housing, said cartridge having a front surface oriented toward said air outlet opening and a rear surface oriented toward said plenum air chamber, a fan assembly mounted in said plenum air chamber for moving air through said air inlet opening and said filter cartridge and out said air outlet opening, a perimeter barrier gasket permanently united to said outer perimeter wall of said frame portion at a location spaced rearwardly from and parallel to said air outlet opening, said gasket being in a plane lying between said front and rear surfaces of said cartridge, a plurality of perimeter connecting structures carried by said outer perimeter wall of said frame portion at locations rearwardly from the plane of said air outlet opening, at least some of said connecting structures being located forwardly of the plane of said gasket and rearwardly of the plane of the front surface of said cartridge, said connecting structures permitting mechanical fastening of the outer perimeter wall of said module housing to the outer perimeter wall of another said module housing in a manner compressing said barrier gasket to form a substantially air tight barrier to air flow between said module housings, and a plurality of mechanical fasteners extending through the perimeter connecting structures carried by the outer perimeter walls of adjacent module housings to thereby fasten the module housings together without any need for interposing securing elements between the outer perimeter walls of the fastened module housings, said array of module housings being easily separated from a said fastened condition without damage to said perimeter barrier gasket for reconfiguration of an assembly of said module housings reusing said barrier gasket.

18. The array of claim 17 wherein each said module additionally comprises a perimeter groove formed in the outer perimeter wall of said frame portion thereof and extending substantially parallel to the air outlet opening thereof, said perimeter barrier gasket being mounted in said perimeter groove and protruding outward from said outer perimeter wall.

19. The array of claim 17 wherein said perimeter connecting structures of each said module comprise two spaced rows of fastener receiving holes extending in parallel relationship to the plane of said air outlet opening of said modules, and wherein said perimeter barrier gasket is located between said rows of fastener receiving holes.

20. An air filtering module for supplying air to a clean air space, comprising:

a module housing having a rear plenum portion and a front frame portion united together, said plenum portion defining a plenum air chamber having a rear air inlet opening, said frame portion defining a filter cartridge mounting space and a planar front air outlet opening, said frame portion having a continuous outer perimeter wall of rectangular configuration extending substantially perpendicular to the plane of said air outlet opening and having a perimeter groove therein extending substantially parallel to and rearwardly of said air outlet opening, a replaceable air filter cartridge mounted in the filter cartridge mounting space of said module housing, said cartridge having a front surface oriented toward said air outlet opening and a rear surface oriented toward said plenum air chamber, a fan assembly mounted in said plenum air chamber for moving air through said air inlet opening and said filter cartridge and out said air outlet opening, a perimeter barrier gasket mounted in said perimeter groove and protruding outward from said outer perimeter wall, said perimeter groove and said gasket being in a plane lying between said front and rear surfaces of said cartridge, a plurality of perimeter connecting structures comprising two spaced rows of fastener receiving holes, each said row extending in parallel relationship to the plane of said air outlet opening, one said row being located forwardly of the plane of said gasket and the other said row being located rearwardly of the plane of said gasket, and each said row being in a plane between said front and rear surfaces of said cartridge, said connecting structures permitting mechanical fastening of the outer perimeter wall of said module housing to the outer perimeter wall of another said module housing in a manner compressing said barrier gasket to form a substantially air tight barrier to air flow between said module housings, said module housings being easily separated from a said fastened condition without damage to said perimeter barrier gasket for reconfiguration of an assembly of said module housings reusing said barrier gasket.

* * * * *